United States Patent [19]

Pellico

[11] 4,234,340
[45] Nov. 18, 1980

[54] ANTIFOULING MARINE COATING COMPOSITION CONTAINING AGAR, A PLASTICIZER AND A STRENGTHENING AGENT

[76] Inventor: Michael A. Pellico, 10753 Palms, Los Angeles, Calif. 90034

[21] Appl. No.: 38,335

[22] Filed: May 11, 1979

[51] Int. Cl.$^3$ ............................................. C09D 5/14
[52] U.S. Cl. ................. 106/15.05; 114/67 R; 106/16; 106/18.3; 106/18.36
[58] Field of Search ............ 106/15.05, 16, 18.3, 106/18.36; 114/67 R

[56] References Cited

U.S. PATENT DOCUMENTS

| | | | |
|---|---|---|---|
| 2,332,196 | 10/1943 | Bjorketen | 114/67 R |
| 3,230,919 | 1/1966 | Crawford | 114/67 R |
| 3,575,123 | 4/1971 | Shepherd et al. | 106/18.31 |

FOREIGN PATENT DOCUMENTS

1182 of 1855 United Kingdom .................. 106/15.05

*Primary Examiner*—Maurice J. Welsh
*Attorney, Agent, or Firm*—Donald Diamond

[57] ABSTRACT

A high strength, non-toxic, antifouling, marine coating composition is provided which comprises agar, a water soluble polyol plasticizer such as dipropylene glycol, a strengthening agent as, for example, potassium borate, and water.

10 Claims, No Drawings

ANTIFOULING MARINE COATING COMPOSITION CONTAINING AGAR, A PLASTICIZER AND A STRENGTHENING AGENT

BACKGROUND OF THE INVENTION

This invention relates to coating compositions and, more particularly, to marine coating compositions having antifouling characteristics.

In the early history of shipping, a detrimental effect on the maneuverability and speed of the ships was noticed after they had been in operation for a period of time. This detrimental effect was found to be caused by the adherence of organisms on the ship's bottom, which phenomena is referred to in the nautical art as fouling. For many centuries, the adhering organisms were removed at the time of dry docking or through frequent careening.

During the 17th century, it was found that a copper sheathed hull escaped the effects of fouling for a considerable period of time. As a result of cost, weight and practicality in the use of copper sheathing, copper paints were formulated for nautical use which had an antifouling effect similar to that of copper sheathing. In addition to the antifouling copper ingredient, certain anticorrosive materials had to be added to these paints to prevent pitting and breakdown of the metal hulls.

The majority of the antifouling paints and coatings, which have been formulated as an improvement on the use of copper sheathing, have incorporated some kind of toxin. These toxic substances work by slowly migrating to the surface of the coating and subsequently forming a lethal concentration of toxin in the surrounding water. These toxins usually consist of heavy metals such as lead, mercury, arsenic, copper and tin as well as organic substances such as chlorinated hydrocarbons or fluorocarbons.

A major problem encountered with all toxic antifouling paints and coatings is the slow release of poisonous substances into the surrounding water. Although these coatings release the greatest amounts of toxins while the ship is in motion, the heaviest marine growth occurs when the ship is stationary. Since the broad spectrum toxicity of most of these substances is manifested at but a few parts per million, the environmental impact of these toxins being released into waters used for commercial fishing becomes apparent.

U.S. Pat. No. 3,575,123 (T. H. Shepherd and F. E. Gould, 1971) discloses the use of water-insoluble hydrophilic acrylate and methacrylate polymers as coatings for the underwater portion of ships and static marine structures. These hydrophilic polymers effectively reduced drag when applied as thin films. The major drawback of this material was its failure to retard the growth of marine fouling organisms which necessitated the incorporation of antifouling, toxic chemicals into the polymer. Although the leaching rate of the toxins from the water-insoluble hydrophilic polymeric compositions was slowed down somewhat, it appears that the inability of this coating to resist fouling in the absence of toxins showed that only a partial answer had been reached.

SUMMARY OF THE INVENTION

In accordance with this invention, there is provided a high strength, non-toxic, marine coating composition which retains its smoothness and offers increased resistance to fouling. The marine coating composition comprises from about 8 to about 15 wt.% agar having a bloom strength of at least about 600, from about 10 to about 40 wt.% of a polyol plasticizer, from about 0.2 to about 2 wt.% strengthening agent and water to 100 wt.%.

DETAILED DESCRIPTION

A. Composition

Agar is generally present in the marine coating compositions of this invention in an amount from about 8 to about 15 wt.% and, preferably, in an amount from about 10 to about 12 wt.%. Agar is the dried mucilagenous substance extracted from plants found growing chiefly off the coasts of Japan, China, Ceylon, Malaya and Southern California. These plants are of the species Gelidium, in particular Gelidium corneum, and other closely related algae (class Rhodophyceae). The final product is obtained through drying and grinding of the plants, yielding in most cases a mediumsized mesh powder.

Chemically, agar is the sulfuric acid ester of a linear galactan, a polysaccharide. Hydrolysis yields the hexose sugars D-galactose and L-galactose, and sulfuric acid in a constant 9:1:1 ratio. In addition, there are several cations associated with the composition, with the principal cation being calcium. These cations are believed to be the cross-linking agents in thick solutions of agar and their subsequent gels. The average chain length of this polysaccharide is anywhere from 200 to 250 sugar residues in length, depending upon the species from which it was orginally extracted. Agar is insoluble in cold water, but is slowly soluble in hot water to give a viscous, straw colored solution. A 1% agar solution melts at 80° to 100° C. and sets at 35° to 50° C. to a rigid gel.

The agar which is most suitable for use in the compositions of this invention has a bloom strength from at least about 600 up to about 800 or more. The term "bloom strength" identifies the gel strength of an agar gel prepared by dissolving one gram of pure agar in 99 grams of boiling water, cooling the agar solution to form a gel and applying a penetrometer to the gel to measure gel or bloom strength.

The polyol plasticizer is generally present in the marine coating composition in an amount from about 10 to about 40 wt.% and, preferably, in an amount from about 15 to about 30 wt.%. The polyol plasticizers which are useful in this invention include propylene glycol, glycerol, pentaerythritol, diethylene glycol, dipropylene glycol and mixtures thereof. In order for the marine coatings of this invention to have suitable toughness and yieldability for marine application, the polyol plasticizer must be present in the composition in an amount of at least about 10 wt.%.

The strengthening agent is generally present in the coating composition in an amount from about 0.2 to about 2 wt.% and, preferably, in an amount from about 0.5 to about 1 wt.%. The strengthening agents which are useful in the coating compositions include sodium borate, potassium borate, calcium sulfate, zinc sulfate and mixtures thereof.

Water is generally present in the coating composition in an amount from about 43 to about 81.8 wt.%. Thus, the fluid content of the composition, water plus polyol plasticizer, is from about 83 to about 91.8 wt.% while the solids content of the composition is from about 8.2 to about 17 wt.%.

B. METHOD

The marine coating compositions of this invention are advantageously prepared by agitating and slowly heating a mixture of agar, polyol plasticizer and water to a temperature of about 100° C. and maintaining the mixture at that temperature with agitation until the agar dissolves in the fluid medium which is usually effected in about 10 to 15 minutes. Upon completion of the agar dissolving step, the strengthening agent is slowly added to the agar solution with continued heating and agitation. The resulting heating composition is a fluid having a thick, honey-like, consistency.

The heated, fluid composition from the aforesaid preparation procedure may be used in a marine coating application or the heated, fluid composition may be allowed to cool and set to a rigid gel and thereafter reheated to fluid consistency for application as a marine coating. The compositions described herein are adapted to be used as coatings for both watercraft and underwater static structures. The term watercraft includes movable boats of all kinds wherein the hull is fabricated from metal, wood, plastic, combinations thereof, or other materials. Underwater static structures include wharves, piers, permanently moored watercraft, pilings, bridge substructures and the like which are made of wood, metal, plastic, concrete or other material.

Where the surface to be treated is a metal surface as, for example, the metal hull of a ship, the hull is first coated with a phosphate or chromate anticorrosion coating. A rigid, gel supporting, lattice structure is then affixed to the anticorrosion coating. This lattice structure may advantageously take the form of a rigid urethane foam. The heated and liquefied agar composition is then applied to the rigid urethane foam by conventional procedures as, for example, spraying, brushing or roller coating. Upon cooling, the agar composition sets to a tough, yieldable gel having a smooth finish. The rigid, cellular, urethane foam functions as a support structure for securing the agar gel to the hull of the vessel.

EXAMPLES

The following examples further illustrate the marine coating compositions of this invention. The agar used in the examples was a high gel strength agar having a bloom strength in excess of 600 with a one cubic inch sample of agar gel being resistent to indentation upon being loaded with a weight force between 400 and 800 grams.

EXAMPLE 1

A marine coating composition was prepared in accordance with the following formulation:

| Ingredients | wt., lbs. |
|---|---|
| Agar | 1.20 |
| Dipropylene glycol | 3.30 |
| Potassium borate | 0.05 |
| Water | 5.45 |
| | 10.00 lbs. |

The composition was prepared by admixing the agar, dipropylene glycol and water and then slowly heating the admixture with agitation to a temperature of 100° C. and maintaining the admixture at this temperature for 15 minutes to complete solubilization of the agar. The potassium borate was then slowly added to the solubilized admixture with continued heating and agitation in order to complete the preparation of the composition.

Test samples of metal, wood and plastic were coated with a rigid urethane foam. One half of each sample was dipped into the heated and fluid agar solution, removed from the solution and permitted to cool to ambient temperature. The agar coating, upon cooling, formed a yieldably tough gel having a smooth surface. The test samples were then placed in the pacific ocean in the vicinity of Los Angeles, California and observed every two weeks for marine growth. At the end of nine months, it was observed that the portions of the test samples coated with the agar gel were completely free of marine growth while the non-agar coated portions of the samples were heavily coated and encrusted with various types of marine growth.

EXAMPLE 2

The following formulations illustrate the various polyol plasticizers and strengthening agents which can be used in the preparation of the marine coating compositions of this invention as well as the concentration ranges for the ingredients of the composition:

| Ingredients | wt. % | |
|---|---|---|
| 2(a) | | |
| Agar | 8 | |
| Propylene glycol | 12 | |
| Potassium borate | 1 | |
| Water | 79 | |
| | 100 | wt. % |
| 2(b) | | |
| Agar | 10 | |
| Propylene glycol | 12 | |
| Potassium sulfate | 1 | |
| Water | 77 | |
| | 100 | wt. % |
| 2(c) | | |
| Agar | 12 | |
| Propylene glycol | 12 | |
| Potassium borate | 1.5 | |
| Water | 74.5 | |
| | 100 | wt. % |
| 2(d) | | |
| Agar | 16 | |
| Diethylene glycol | 20 | |
| Sodium borate | 0.5 | |
| Water | 64.5 | |
| | 100 | wt. % |
| 2(e) | | |
| Agar | 12 | |
| Dipropylene glycol | 40 | |
| Calcium sulfate | 2 | |
| Water | 46 | |
| | 100 | wt. % |
| 2(f) | | |
| Agar | 12 | |
| Pentaerythritol | 15 | |
| Zinc sulfate | 5 | |
| Water | 68 | |
| | 100 | wt. % |
| 2(g) | | |
| Agar | 12 | |
| Hexamethylene glycol | 20 | |
| Potassium borate | 1.5 | |
| Water | 66.5 | |
| | 100 | wt. % |
| 2(h) | | |
| Agar | 14 | |
| Glycerol | 18 | |
| Potassium borate | 0.5 | |
| Water | 67.5 | |
| | 100 | wt. % |
| 2(i) | | |

| Ingredients | wt. % |
| --- | --- |
| Agar | 12 |
| Dipropylene glycol | 60 |
| Potassium borate | 1.0 |
| Water | 27.0 |
| | 100 wt. % |

It is believed that the ability of the compositions of this invention to resist fouling by marine organisms is a result of the high liquid to solids ratio in the formulation. The inherently unique surface properties of the compositions can be seen to act as a deterrent to fouling on both a microscopic and macroscopic scale. It has long been suspected that a primary film formation by bacteria is the first in a series of events leading to gross fouling on marine structures. This initial attachment by microbial organisms depends upon certain chemotactic responses such as hydrophobicity and roughness of the structure's surface. Once the bacterial film has been formed, the attachment of larger and more harmful fouling organisms occurs. The high liquid content and the smooth surface of the compositions described herein appears to impede the anchoring mechanism upon which marine growth is predicated.

When the agar gel of this invention is used to coat a ship's hull, the nautical efficiency of the ship is improved since the coating is yieldable which permits a more laminar flow of water past the hull and thereby reduces linear drag.

In view of the foregoing description and examples, it will become apparent to those of ordinary skill in the art that equivalent modifications thereof may be made without departing from the spirit and scope of this invention.

That which is claimed is:

1. A marine coating composition comprising from about 8 to about 15 wt.% agar, from about 10 to about 40 wt.% of a polyol plasticizer having at least three carbon atoms and at least two hydroxyl groups, from about 0.2 to about 2 wt.% of a strengthening agent selected from the group consisting of sodium borate, potassium borate, calcium sulfate, zinc sulfate and mixtures thereof, and water to 100 wt.%.

2. The composition of claim 1 wherein the concentration of agar is from about 10 to about 12 wt.%.

3. The composition of claim 1 wherein the concentration of polyol plasticizer is from about 15 to about 30 wt.%.

4. The composition of claim 1 wherein the polyol plasticizer is a member selected from the group consisting of propylene glycol, glycerol, pentaerythritol, hexamethylene glycol, diethylene glycol, dipropylene glycol and mixtures thereof.

5. The composition of claim 1 wherein the concentration of the strengthening agent is from about 0.5 to about 1 wt.%.

6. A watercraft having an adherent coating comprising from about 8 to about 15 wt.% agar, from about 10 to about 40 wt.% of a polyol plasticizer having at least three carbon atoms and at least two hydroxyl groups, from about 0.2 to about 2 wt.% of a strengthening agent selected from the group consisting of sodium borate, potassium borate, calcium sulfate, zinc sulfate and mixtures thereof, and water to 100 wt.%.

7. The watercraft of claim 6 wherein the concentration of agar is from about 10 to about 12 wt.%.

8. The watercraft of claim 6 wherein the concentration of polyol plasticizer is from about 15 to about 30 wt.%.

9. The watercraft of claim 6 wherein the polyol plasticizer is a member selected from the group consisting of propylene glycol, glycerol, pentaerythritol, hexamethylene glycol, diethylene glycol, dipropylene glycol and mixtures thereof.

10. The watercraft of claim 6 wherein the concentration of the strengthening agent is from about 0.5 to about 1 wt.%.

* * * * *